Aug. 11, 1953  S. MOLL  2,648,341
DENTAL FLOSS HOLDER
Filed Sept. 30, 1952
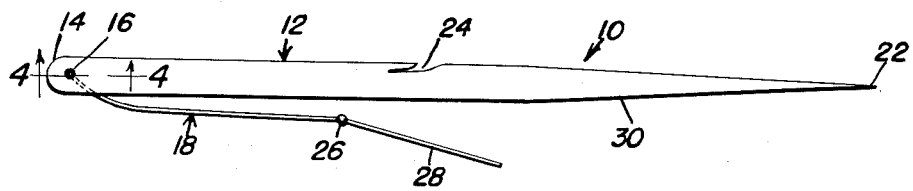
Fig. 1
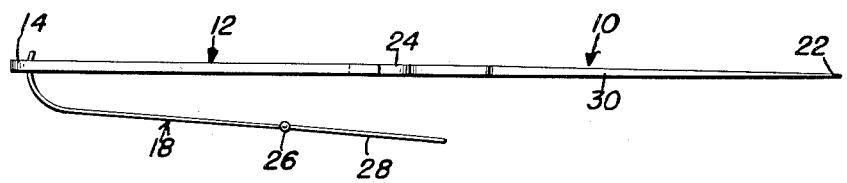
Fig. 2
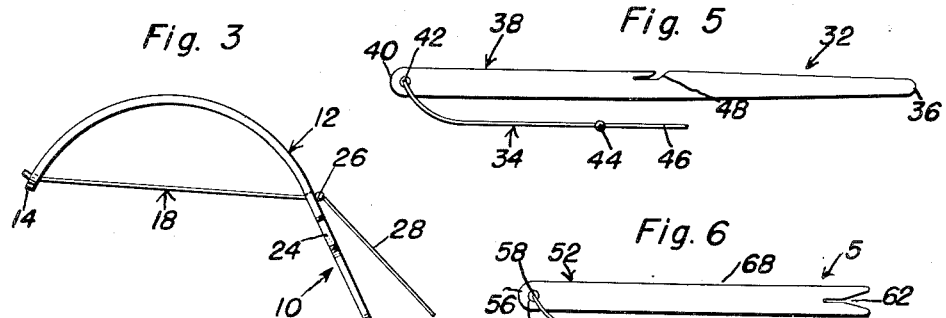
Fig. 3
Fig. 5
Fig. 6
Fig. 7
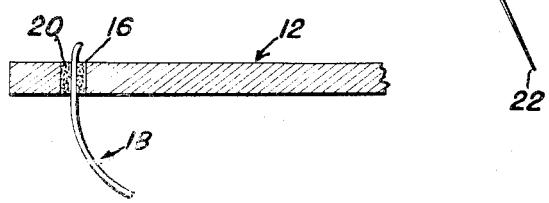
Fig. 4
Simon Moll
INVENTOR.
BY *Clarence A. O'Brien*
and *Harvey B. Jackson*
Attorneys Patented Aug. 11, 1953

2,648,341

UNITED STATES PATENT OFFICE 2,648,341

DENTAL FLOSS HOLDER

Simon Moll, Pittsburgh, Pa.

Application September 30, 1952, Serial No. 312,295

2 Claims. (Cl. 132—91)

This invention relates in general to tooth cleaning devices, and more specifically to a dental floss unit.

The primary object of this invention is to provide an improved dental floss unit which may be utilized to tension a length of dental floss for the purpose of facilitating the cleaning of teeth with the same.

Another object of this invention is to provide an improved dental floss unit which is of a relatively simple construction whereby the cost of the same is such that it may be thrown away after being utilized for one tooth cleaning operation.

Another object of this invention is to provide an improved dental floss unit which is so constructed and designed whereby the same may be easily dispensed.

A further object of this invention is to provide an improved handle member to which dental floss may be secured, said handle member being of relatively simple construction whereby the same may be relatively inexpensive and disposable after being utilized.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a side elevational view of a preferred form of dental floss unit as the same appears immediately after being dispensed;

Figure 2 is a top view of the dental floss unit of Figure 1 and shows the general shape of the dental floss holder;

Figure 3 is a rotated plan view of the dental floss unit of Figures 1 and 2 and shows the dental floss in a taut position with a portion of the dental floss holder bowed;

Figure 4 is an enlarged fragmentary longitudinal sectional view taken substantially upon the plane indicated by the section line 4—4 of Figure 1 and shows the manner in which one end of a length of dental floss may be rigidly secured to a dental floss holder adjacent one end thereof;

Figure 5 is a side elevational view of the modified form of the dental floss unit;

Figure 6 is a side elevational view of a still further modified form of dental floss unit and shows the general outline thereof; and Figure 7 is an enlarged fragmentary side elevational view of one end of a still further form of dental floss unit and shows a modified method of attaching a length of dental floss to the dental floss holder, the dental floss holder having one end thereof broken away and shown in section in order to clearly illustrate the connection.

Similar characters of reference designate similar or identical elements and portions throughout the specification and throughout the different views of the drawings.

Referring now to the drawings in detail, it will be seen that there is illustrated in Figures 1 through 4 a preferred form of dental floss holder which is referred to in general by the reference numeral 10. The dental floss holder 10 includes an elongated flexible member 12 which may be formed of plastic or any other suitable material. The flexible member 12 is generally flat and narrow and has a rectangular cross-section. One end of the flexible member 12 is rounded, as at 14, and is provided with a transverse bore 16 therethrough.

As is best illustrated in Figure 4, passing through the bore 16 is one end of a length of dental floss formed of cotton, linen, plastic, or other suitable threads, the dental floss being referred to by the reference numeral 18. Disposed within the bore 16 and securing the said one end of the dental floss 18 to the flexible member 12 is a suitable adhesive 20.

The flexible member 12 tapers both in width and thickness at its other end to form a point 22. The point 22 is intended to be utilized as a toothpick.

Intermediate the ends thereof, the flexible member 12 is provided with an elongated tapered notch 24 in one side edge thereof. The notch 24 opens away from the rounded end 14 of the flexible member and is adapted to have received therein a portion of the dental floss.

It will be noted that the dental floss 18 is provided intermediate its ends with an enlargement 26 which may be in the form of a knot, a bead, or the like. The free end of the dental floss 18 adjacent the enlargement 26 is of such length to form a grip portion 28.

When it is desired to utilize the complement dental floss holder 10 for the purpose of cleaning foreign matter from between one's teeth, the grip portion 28 of the dental floss 18 is grasped in one's hand and pulled taut. At the same time, the flexible member 12 is gripped in one's other hand by grasping a grip portion 30 thereof, the grip portion 30 being disposed between the pointed end 22 and the notch 24. The tension on the dental floss 18 results in the bowing of the portion of the flexible member 12 between the rounded end 14 and the notch 24 in the manner illustrated in Figure 3. The dental floss 18 is then disposed within the notch 24 and the enlargement 26 engages a portion of the flexible member 12 adjacent the notch 24 to prevent sliding of the dental floss therethrough.

After the flexible member 12 and the dental floss 18 has been arranged in the manner illustrated in Figure 3, the bowed portion of the flexible member 12 may be passed into one's mouth and the dental floss 18 moved between adjacent teeth to remove foreign particles therebetween.

Referring now to Figure 5, in particular, it will be seen that there is illustrated a modified form of dental floss unit which is referred to in general by the reference numeral 32. The dental floss unit 32 differs from the dental floss holder 10 only in that the end thereof remote from its dental floss 34 is rounded as at 36 in lieu of being in the form of a point. The flexible member of the dental floss unit 32 is referred to in general by the reference numeral 38 and has a second rounded end 40 opposite from the rounded end 36. Also, the rounded end portion is provided with a bore 42 in which is secured one end of the dental floss 34.

The dental floss 34 is provided with an enlargement 44 and a grip portion 46 in the same manner as is the dental floss 18. The enlargement 44 of the dental floss is engageable with the flexible member 38 adjacent a notch 48 formed in one edge thereof intermediate its ends. It will be understood that the portion of the flexible member 38 between the rounded end 40 and the notch 48 will be bowed in the same manner as is the flexible member 12 in Figure 3 when the dental floss 34 is properly positioned.

Referring now to Figure 6 in particular, it will be seen that there is illustrated still another form of dental floss unit which is referred to in general by the reference numeral 50. The dental floss unit 50 includes a flexible member, which is referred to in general by the reference numeral 52, forming a holder for dental floss 54. The flexible member 52 includes a rounded end 56 and that portion thereof adjacent the rounded end is provided with a transverse bore 58. Secured within the bore 58 by a suitable adhesive 60 is one end of the dental floss 54.

The opposite end of the flexible member 52 is provided with an outwardly open notch 62 in which is adapted to be received an intermediate portion of the dental floss 54. The dental floss 54 is provided with an enlargement 64 which is adapted to engage a surface of the flexible member 52 adjacent the notch 62 so that the dental floss 54 may be tensioned and the flexible member 52 bowed. In order to facilitate engagement of the dental floss 54 within the notch 62, the free end thereof is provided with a grip portion 66.

It will be understood that when the dental floss 54 is properly positioned, the flexible member 52 will be bowed in the manner of that portion of the flexible member 12 between its rounded end 14 and the notch 24, as is best illustrated in Figure 3. That portion of the flexible member 52 between the ends thereof is intended to form a grip portion 68 in order that the same may be held while cleaning teeth with the dental floss 54.

Referring now to Figure 7 in particular, it will be seen that there is illustrated still another form of flexible member which is referred to in general by the reference numeral 68. The flexible member 68 is provided with a rounded end 70 which has formed therein a longitudinal bore 72. Disposed within the bore 72 and secured thereto by a suitable adhesive 74 is one end of a length of dental floss 76. It will be understood that the method of securing the dental floss 76 to the flexible member 68 may be applied to the dental floss unit of Figures 1 through 6. It will also be understood that other types of fastening means may be utilized in securing the dental floss to its respective flexible member, said fastening means including stitching, stapling, etc.

By providing a dental floss unit which includes a flexible member in the form of a holder and a dental floss having one end thereof permanently secured to the flexible member, it will be seen that the same may be dispensed as a unit without the possibility of the separation of the two. Also, inasmuch as the flexible members will be dispensed in a flat state, the same may be conveniently packaged and dispensed through existing dispensing machines, in the same manner as are toothpicks.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A disposable dental floss holder comprising a normally flat, elongated resilient member having a length of dental floss permanently secured to one end thereof, a grip portion formed adjacent the opposite end thereof, a dental floss receiving notch formed in said member intermediate the ends thereof, said dental floss being adapted to have an intermediate portion thereof tautly retained in said notch with said member being bowed intermediate said one end and said notch.

2. A disposable dental floss holder comprising a normally flat, elongated resilient member having a length of dental floss permanently secured to one end thereof, a grip portion formed adjacent the opposite end thereof, a dental floss receiving notch formed in said member intermediate the ends thereof, said dental floss being adapted to have an intermediate portion thereof tautly retained in said notch with said member being bowed intermediate said one end and said notch, said one end of said member having a bore disposed therein, one end of said dental floss being disposed with said bore and secured to walls thereof by an adhesive.

SIMON MOLL.

References Cited in the file of this patent

UNITED STATES PATENTS

| Number | Name | Date |
| --- | --- | --- |
| 175,794 | Wallace | Apr. 4, 1876 |
| 542,782 | Simons | July 16, 1895 |
| 577,468 | Tissington | Feb. 23, 1897 |
| 2,180,522 | Henne | Nov. 21, 1939 |